Aug. 18, 1931.                W. ERNST                1,819,703
                               VALVE
                         Filed Dec. 29, 1930
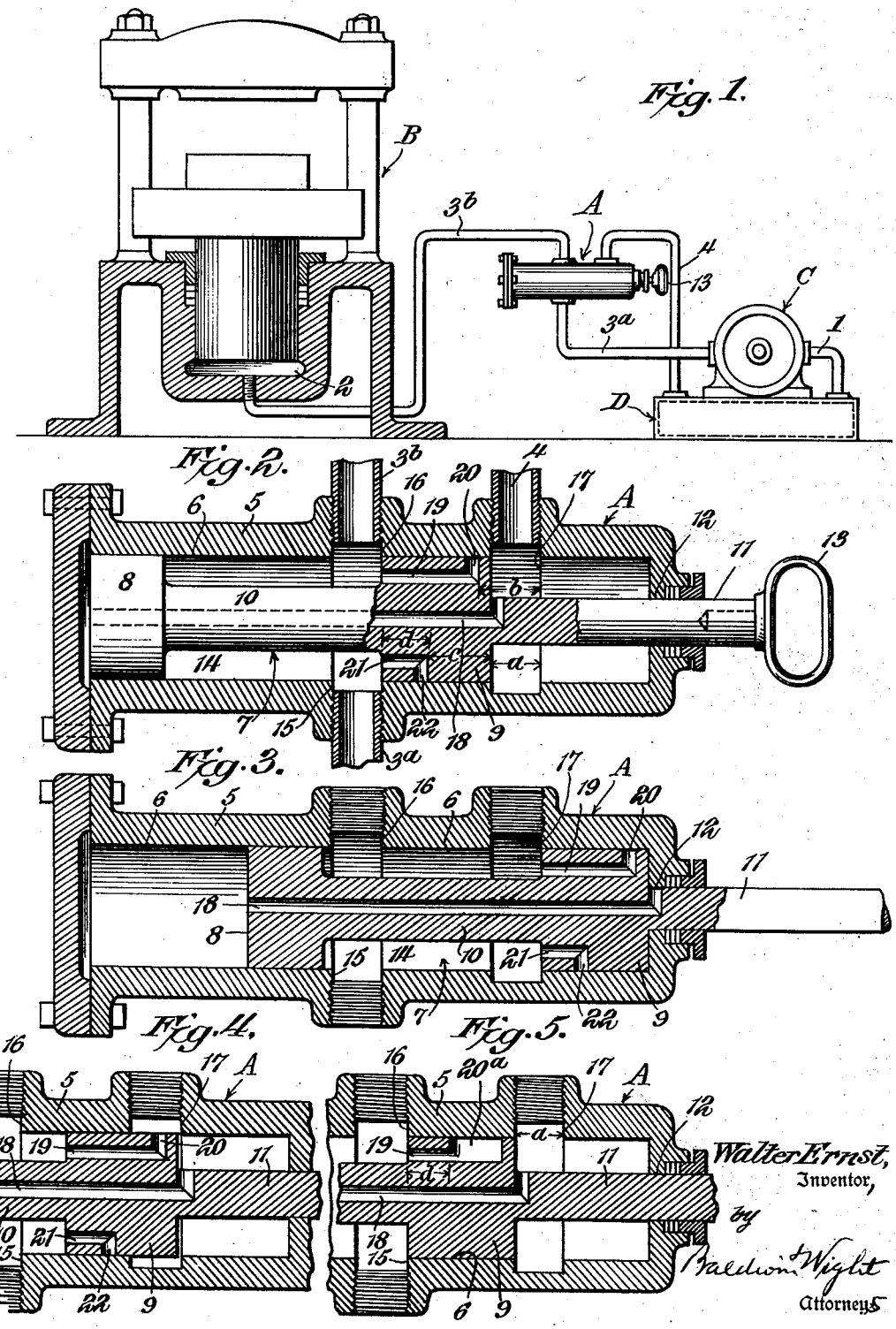
Walter Ernst,
Inventor,
by
Baldwin Wight
Attorneys Patented Aug. 18, 1931

1,819,703

UNITED STATES PATENT OFFICE

WALTER ERNST, OF MOUNT GILEAD, OHIO, ASSIGNOR TO THE HYDRAULIC PRESS MANUFACTURING COMPANY, OF MOUNT GILEAD, OHIO

VALVE

Application filed December 29, 1930. Serial No. 505,402.

This invention relates to valves and more particularly to valves used for controlling the confinement in and exhausting from a pressure vessel of a relatively compressible liquid, such as oil.

When oil or similar liquid is supplied under high pressure to a vessel for performing some useful function, such for example, as for advancing the ram of a hydraulic press or the like, the oil will undergo a slight decrease in volume, that is, it will be compressed to a certain extent. This is believed to be due to the fact that oil contains entrapped gases which, when subjected to high pressure, are naturally compressed with an accompanying decrease in volume of the entire body of oil under pressure.

It is usual to provide an exhaust valve for controlling the communication of pressure vessels of the kind referred to with an exhaust, in order that the liquid may be expelled from the vessel when desired. When such an exhaust valve is moved past its cooperating port with any appreciable degree of rapidity, the liquid under pressure in the vessel is placed in communication with the exhaust quickly as a result of which the fluid, having been in a compressed state, undergoes a very rapid expansion. This produces a serious shock which is of course detrimental to the vessel, the valve and parts associated therewith. For this reason, it has heretofore been necessary, in order to eliminate or minimize such shocks, to open such exhaust valves very gradually in order to provide for a gradual expansion of the compressed liquid. Such a slow opening of the valve is manifestly undesirable since it reduces the speed of operation of machinery associated with the vessel and valve.

An object of the present invention is to overcome this difficulty by the provision of a valve for controlling the exhausting of a vessel containing fluid under pressure, the valve being so constructed or equipped that during rapid movement thereof to its open position it will first afford relatively restricted communication of the vessel with an exhaust for an appreciable period of time to thus provide for the gradual expansion of the compressed fluid, and will then afford relatively unrestricted commmunication of the vessel with the exhaust to provide for the free discharging of the fluid from the vessel.

A more specific object is to provide a valve of the character described including a movable element provided with a relief passage one end of which is in constant communication with a pressure vessel, and the other end of which is adapted, upon movement of the valve to effect communication of the vessel with an exhaust, to register with or come into communication with an exhaust port to provide relatively restricted communication of the vessel with the exhaust before the valve has been moved sufficiently to provide relatively unrestricted communication therebetween. Other objects will become apparent from a reading of the following description, the appended claims, and the several views of the drawings, in which:

Figure 1 is a diagrammatic view of a simple arrangement of a hydraulic press, a pump, and associated piping, and illustrating one use of a valve embodying the invention;

Figure 2 is a longitudinal vertical sectional view of a valve embodying the invention in one form;

Figure 3 is a view similar to Figure 2, a piston valve element being shown in a different position from that shown in Figure 2;

Figure 4 is a fragmentary longitudinal vertical sectional view of the valve shown in Figure 2, the piston valve being shown in still another position; and Figure 5 is a view similar to Figure 4 showing a modification.

In Figure 1 of the drawings a valve generally designated A is illustrated as being arranged to control the operation of a hydraulic press B, to which fluid is supplied under pressure by a pump C arranged to receive its intake from a tank D through the medium of a pipe 1 and to discharge fluid under pressure to the pressure cylinder 2 of the press A by means of a delivery pipe line 3ª 3ᵇ.

The valve A is interposed in the delivery pipe line and affords constant communication of the pump with the press cylinder and is adapted to either prevent communication of the cylinder with an exhaust pipe 4 or to provide communication therebetween for permitting fluid to be expelled from the cylinder. Thus, when the valve is adjusted to close communication between the exhaust pipe 4 and the portion 3^b of the delivery pipe line, fluid will be delivered under pressure to the cylinder 2 of the press which will result in the performance of a pressing stroke by the press ram. When the stroke has been completed and the valve adjusted to afford communication between the exhaust pipe 4 and both portions 3^a and 3^b of the delivery pipe line, the fluid contained in the cylinder 2 will be expelled therefrom by the gravitational descent of the ram and will be returned to the tank D.

Referring to Figures 2, 3 and 4, which show one form of valve embodying the invention, the valve illustrated includes a casing 5 formed with a bore 6 closed at each of its ends, and a piston valve element 7 mounted for sliding movements within the bore. The piston valve includes spaced heads 8 and 9 connected by an intervening stem 10 and is provided with an operating stem 11 which projects axially from the head 9 and through a packed opening 12 in the casing, the outer end of the stem 11 being provided with a suitable operating handle 13. The space included between the heads 8 and 9 and the bore intervening between said heads in any particular position of the piston valve constitutes a valve chamber 14. The valve casing is provided with a passage 15, the outer end of which receives the pipe 3^a, and the inner end of which opens into the valve chamber 14; and with a delivery passage 16, the outer end of which receives the delivery pipe 3^b and the inner end of which constantly communicates with the valve chamber. Both of the passages 15 and 16 are at all times, that is, in any position of the piston, disposed between the heads 8 and 9, and it will be observed that when the piston valve is in its extreme left hand or Figure 2 position, the left hand end of the head 9 is immediately adjacent the passages 15 and 16. An annular exhaust port 17 is formed in the bore and is located just to the right of the head 9 when the latter is in its Figure 2 position, that is, the port is located to the side of the head opposite that on which the delivery passage 16 lies. The exhaust port is arranged to communicate with the exhaust pipe 4. A vent passage 18 extending from the outer end of the head 8 and through the stem 10 and the head 9, opens laterally outwardly through the operating stem 11 and provides for the maintenance of equal pressures on the outer faces of the heads 8 and 9.

In operation the valve 7 is placed in its Figure 2 position when it is desired to deliver fluid under pressure to the cylinder 2 of the press. The fluid enters the valve chamber 14 through the pipe 3^a and passage 15 and is then delivered to the cylinder through the medium of the passage 16 and the delivery pipe 3^a. When the pressing stroke of the press ram has been completed and it is desired to permit the latter to return to its lower position, the valve 7 will be moved to the right past the exhaust port 17 and to its Figure 3 position in which relatively unrestricted communication between delivery passage 16 and the exhaust port 17 is established, after which the press ram will descend gravitationally and will expel the fluid from the cylinder 2, returning it to the tank.

In accordance with the invention, means are provided for establishing relatively restricted communication between the delivery passage 16 and the exhaust port 17 during movement of the piston valve from its Figure 2 position to its Figure 3 position before such movement has been completed and before relatively unrestricted communication between the passage 16 and the exhaust port has been established. In the embodiment of the invention illustrated in Figures 2, 3 and 4, this means comprises a small relief passage comprising a longitudinally extending portion 19, one end of which opens to the valve chamber at the end of the head 9 adjacent the delivery passage 16 and the other end of which merges with a laterally extending portion 20, the outer end of which opens on the peripheral surface of the head 9. The head 9 is further provided with a similar small relief passage including a longitudinally extending portion 21 opening at one of its ends to the valve chamber and a laterally extending portion 22 which opens on the peripheral surface of the head at a point nearer the side of the head adjacent the relief passage 16 than the laterally extending portion 20 of the first mentioned relief passage. In operation, when the valve is moved from its Figure 2 position to the right to connect the delivery passage 16 with the exhaust port, the portion 20 of the first relief passage, upon registering with the exhaust port, will provide restricted communication between the passage 16 and the exhaust port. The relative positions of the parts will then be as shown in Figure 4. This serves to permit a slight discharge of fluid from the press cylinder and to gradually relieve the high pressure previously built up therein. Upon further movement of the valve 7 to the right, the laterally extending portion 20 will pass to the other side of the exhaust port and will be covered by the valve casing inner wall. Just before this takes place, the laterally extending portion 22 of the other relief passage will come into registry with the exhaust port and will serve to provide continued restricted communication between the passage 16 and the exhaust port. When the valve has been moved farther to the right until the left end of the head 9 uncovers the exhaust port, relatively unrestricted communication between the passage 16 and the port 17 is established and the fluid will then be freely expelled from the cylinder 2 of the press. By the time that this relatively unrestricted communication is established the pressure in the press cylinder will have been sufficiently reduced to eliminate the shocks which would otherwise occur if relatively unrestricted communication were established prior to any relief of the pressure. It is desirable that after the laterally extending portion of the first relief passage comes into registry with the exhaust port, continued restricted communication be provided until the unrestricted communication is established. For this reason, it is preferable that the valve head, casing, and the exhaust port be so constructed and arranged that the dimension $a$ equal the dimension $d$ and that the dimension $b$ equal the dimension $c$, as shown in Figure 2.

In the modified form of the valve shown in Figure 5, all the parts, passages, etc. are the same as described above with the exception that, instead of providing two relief passages the laterally extending portions of which open at longitudinally spaced points on the peripheral surface of the valve head, there is provided a single relief passage having an elongated, laterally extending portion $20^a$. It will be clear that through the provision of this elongated portion uninterrupted relatively restricted communication will be provided for during movement of the valve head past the exhaust port, this communication being maintained until the valve head has been moved to a position corresponding to its Figure 3 position to establish unrestricted communication between the delivery passage and the exhaust port. In order to provide for uninterrupted restricted communication during movement of the head 8 past the exhaust port, it is preferable that in this form of valve the dimension $d$, indicated on Figure 5, be less than the dimension $a$.

Through the provision of the novel means for relieving pressure in a pressure vessel gradually in accordance with my invention, it is possible to quickly open a valve controlling communication between a vessel containing fluid under high pressure and an exhaust without the occurrence of shocks due to rapid expansion of the fluid. In this way greater operating speed of a hydraulic machine in connection with which a valve constructed in accordance with my invention is used is attainable. The two forms of valve illustrated and described represent practical embodiments of the invention, but it is clear that various modifications may be made in the structural details without departing from the spirit of the invention, which is defined in the appended claims.

I claim:

1. In a valve; a valve casing formed with a chamber adapted to be connected to a pressure vessel or the like and having an exhaust port; and a valve element which is movable to control communication between said chamber and said port, said element being provided with a relief passage which, during movement of said element to establish said communication, is adapted to afford relatively restricted communication therebetween before said element has uncovered said port to establish relatively unrestricted communication.

2. A valve element adapted to be mounted to control communication between a valve chamber and a port past which said element is movable to establish relatively unrestricted communication between said chamber and port, said element being provided with a passage arranged to afford relatively restricted communication between said chamber and port during movement of said element and before said element has been moved sufficiently to establish relatively unrestricted communication.

3. In a valve; a valve casing formed with a chamber adapted to be connected to a pressure vessel or the like, and having an exhaust port; and a valve element in said chamber and adapted to be positioned to prevent communication between said chamber and said port and being movable to permit relatively unrestricted communication therebetween, said element having pressure relief means adapted, during movement of said element to establish said communication, to afford relatively restricted communication between said chamber and port before the movement of said element has established relatively unrestricted communication therebetween.

4. In a valve; a valve casing formed with a valve chamber adapted to be connected to a pressure vessel, and having an exhaust port; a valve element slidably mounted in said casing and being adapted to be positioned to prevent communication between said chamber and said port and being adapted to be moved past the latter to afford relatively unrestricted communication between said chamber and port; and a passage in said element one end of which is in constant communication with said chamber and the other end of which opens laterally from said element and is adapted, when the latter is being moved past said port, to afford relatively restricted communication between said chamber and port.

5. In a valve; the combination with a casing formed with a cylindrical bore defining a chamber; of a delivery passage in said casing arranged to communicate with said chamber and with a fluid pressure work cylinder; an exhaust port in said casing; a piston valve having a head slidable in said bore for controlling communication between said passage and port, said head being slidable past said port for establishing relatively unrestricted communication between said port and delivery passage; and a relief passage in said head one end of which is in constant communication with said delivery passage and the other end of which opens laterally from said head, said relief passage being adapted to afford relatively restricted communication between said delivery passage and port during movement of said head past said port before said relatively unrestricted communication has been established.

6. In a valve; the combination with a valve casing having a cylindrical bore defining a chamber; of a delivery passage in said casing arranged to communicate with said chamber and adapted to be connected to a pressure vessel; an exhaust port in said casing and longitudinally spaced from said passage; a piston valve slidable in said bore and having a head adapted to be positioned between said passage and port to prevent communication therebetween and being adapted to be moved past the port to establish communication therebetween; and a small relief passage in said valve head one end of which opens from the end of the head adjacent said delivery passage and the other end of which opens laterally from the periphery of said head, said last named end being closed by said bore when said head is positioned between said delivery passage and said port, and opening into said port during movement of said head past said port.

7. In a valve; the combination with a valve casing having a cylindrical bore defining a chamber; of a delivery passage in said casing arranged to communicate with said chamber and adapted to be connected to a pressure vessel; an exhaust port in said casing and longitudinally spaced from said passage; a piston valve slidable in said bore and having a head adapted to be positioned between said passage and port to prevent communication therebetween and being adapted to be moved past the port to establish communication therebetween; a small relief passage in said valve head one end of which opens from the end of the head adjacent said delivery passage, and the other end of which opens laterally from the periphery of said head at a point near the opposite end of said head; and another small relief passage in said valve head, one end of which opens from the end of the head adjacent said delivery passage and the other end of which opens laterally from the periphery of said head at a point nearer the end of the head adjacent the delivery passage than does the laterally opening end of said first relief passage, the laterally opening ends of said relief passages being closed by said bore when said head is positioned between said delivery passage and said port, and being adapted to successively open into said port during movement of the head past the port to thereby provide uninterrupted relatively restricted communication between said delivery passage and port before said head has been moved to establish relatively unrestricted communication therebetween.

8. In combination; a valve casing; a delivery passage therein; an exhaust port in the casing and spaced from the delivery passage; and a valve element mounted for movements in the casing and being adapted to be positioned between said passage and port to prevent communication therebetween and to be moved away from said passage and past said port to establish relatively unrestricted communication therebetween, said element having a relief passage of small cross-sectional area adapted to be closed when said head is positioned between said delivery passage and said port and being adapted to be opened during movement of the valve head past said port, to thereby establish relatively restricted communication between said delivery passage and port before said relatively unrestricted communication has been established.

In testimony whereof I have hereunto subscribed my name.

WALTER ERNST.